(12) United States Patent
Kruijer et al.

(10) Patent No.: US 10,823,065 B2
(45) Date of Patent: Nov. 3, 2020

(54) PROCESS AND CONFIGURATION TO OBTAIN A COMPRESSED GAS

(71) Applicant: ICE INDUSTRIAL PROPERTIES B.V., Nieuw Vennep (NL)

(72) Inventors: George Johannes Kruijer, Hoofddorp (NL); Johannes Arjen Hoogland, Hoofddorp (NL)

(73) Assignee: ICE INDUSTRIAL PROPERTIES, Nieuw-Vennep (NL)

( * ) Notice: Subject to any disclaimer, the term of this patent is extended or adjusted under 35 U.S.C. 154(b) by 1121 days.

(21) Appl. No.: 14/910,074

(22) PCT Filed: Jul. 25, 2014

(86) PCT No.: PCT/NL2014/050511
§ 371 (c)(1),
(2) Date: Feb. 4, 2016

(87) PCT Pub. No.: WO2014/171835
PCT Pub. Date: Oct. 23, 2014

(65) Prior Publication Data
US 2016/0177826 A1    Jun. 23, 2016

(30) Foreign Application Priority Data

Aug. 15, 2013 (NL) .................................. 2011309

(51) Int. Cl.
| | |
|---|---|
| *F02C 7/08* | (2006.01) |
| *F28D 17/04* | (2006.01) |
| *F28D 21/00* | (2006.01) |
| *F02C 3/02* | (2006.01) |
| *F02C 1/08* | (2006.01) |
| *F28D 17/00* | (2006.01) |
| *F01D 15/10* | (2006.01) |

(Continued)

(52) U.S. Cl.
CPC ............... *F02C 7/08* (2013.01); *F01D 15/10* (2013.01); *F02C 1/08* (2013.01); *F02C 3/02* (2013.01); *F02C 3/04* (2013.01); *F02C 7/04* (2013.01); *F02C 7/22* (2013.01); *F28D 7/0008* (2013.01); *F28D 17/00* (2013.01); *F28D 17/04* (2013.01); *F28D 21/001* (2013.01); *F28F 5/02* (2013.01); *F05D 2220/32* (2013.01); *F05D 2240/35* (2013.01)

(58) Field of Classification Search
CPC .......... F28F 5/02; F28D 7/0008; F28D 17/04; F28D 21/001; F28D 17/00; F02C 7/08; F02C 7/04; F17C 13/00; F17C 2205/013; F17C 2205/0134; F17C 2205/0138
USPC ...................... 220/581, 4.12, 567.2
See application file for complete search history.

(56) References Cited

U.S. PATENT DOCUMENTS 4,281,256 A * 7/1981 Ahrens ................ F02C 6/16
290/1 R
6,487,843 B1   12/2002 Tomczyk
(Continued)

*Primary Examiner* — William H Rodriguez
*Assistant Examiner* — Thomas P Burke
(74) *Attorney, Agent, or Firm* — Nixon Peabody LLP; Ronald I. Eisenstein; Nicole D. King

(57) ABSTRACT

The invention is directed to a process to increase pressure and temperature of a feed gas by means of indirect heat exchange against a fluid having a higher temperature to obtain a gas high in pressure and temperature in a system. The system comprises a fluidly interconnected inlet zone, a heat exchange zone, a product gas zone and a low pressure outlet zone.

12 Claims, 8 Drawing Sheets

(51) Int. Cl.
*F02C 3/04* (2006.01)
*F02C 7/04* (2006.01)
*F02C 7/22* (2006.01)
*F28D 7/00* (2006.01)
*F28F 5/02* (2006.01)

(56) References Cited

U.S. PATENT DOCUMENTS

| | | | | |
|---|---|---|---|---|
| 7,937,930 | B1* | 5/2011 | Dunn | F02C 7/10 60/39.511 |
| 9,810,149 | B2* | 11/2017 | Hoogland | F02C 7/10 |
| 2006/0059919 | A1* | 3/2006 | Leachman | F23L 15/00 60/772 |
| 2008/0216510 | A1* | 9/2008 | Vandor | F02C 6/16 62/600 |

* cited by examiner

PROCESS AND CONFIGURATION TO OBTAIN A COMPRESSED GAS

CROSS REFERENCE TO RELATED APPLICATIONS

This application is a 371 National Phase Entry of International Patent Application No. PCT/NL2014/050511 filed on Jul. 25, 2014 which claims benefit under 35 U.S.C. § 119(b) of NL Application Number 2011309 filed on Aug. 15, 2013, the contents of which are incorporated herein by reference in their entirety.

FIELD OF THE INVENTION

The invention is directed to a process to obtain a compressed gas starting from a starting gas having a lower pressure.

BACKGROUND OF THE INVENTION

Compressing gas is a well known process. Typically compressors are used to compress a gas. Gas compression is for example part of a gas turbine process to generate power. US-A-2011/0088404 describes a process wherein air is compressed in a gas compressor. The compressed air is combusted with a fuel and the resulting hot process gas is expanded in an expander. The expander is coupled to a device to convert the rotational energy to power, e.g. electrical power. The energy required to operate the compressor is typically delivered by the rotational energy of the expander by a direct coupling of the compressor and the expander as shown in FIG. 1 of this publication. This publication also describes the use of a source of waste heat to be used to heat partially compressed air as obtained in the compressor. This heated air is used to generate additional power in a lower pressure expansion stage.

BE1016500 describes a process wherein air is compressed in several compression stages. The compressed air is used in a combustion turbine. Before being compressed the air is heated using heat recovery from the exhaust gas of the turbine.

US2011/036097 describes a rotary regenerative heat exchanger for heat exchange between a compressed gas and the exhaust gas of a combustor.

U.S. Pat. No. 6,487,843 described a compressor type machine in which air is enclosed in air chambers present between interlocking rotating blades as present on two screw spindles. The air is heated isochorically against exhaust gasses flowing counter-currently through the hollow blades.

A disadvantage of a traditional gas turbine process as illustrated above is that a large compressor is required. A further disadvantage is that the energy to operate the compressor is provided by the rotational energy of the expanders of the gas turbine. Thus part of the energy obtained in the expanders is used for compressing the combustion air. This coupled system makes the gas turbine process expensive and less efficient. It is an object of the present invention to provide an alternative process for compressing a gas.

SUMMARY OF THE INVENTION

This invention is directed to a process to increase pressure and temperature of a feed gas by means of indirect heat exchange against a fluid having a higher temperature to obtain a gas high in pressure and temperature in a system comprising a fluidly interconnected inlet zone, a heat exchange zone, a product gas zone and a low pressure outlet zone and wherein the following steps are performed:

(a) moving the content of the inlet zone comprising the feed gas to the heat exchange zone, the content of the heat exchange zone to the low pressure outlet zone and the content of the low pressure outlet zone to the inlet zone, (b) enclosing the heat exchange zone and maintaining the gas in the heat exchange zone for a time sufficient to increase pressure and temperature of the gas by means of indirect heat exchange against the fluid wherein the gas high in pressure and temperature is discharged to the product gas zone, and repeating steps (a)-(b) in a further cycle, wherein during step (b) a fresh gas zone comprising part of the feed replaces the inlet zone to become the inlet zone of step (a) in the next cycle and the thus replaced inlet zone replaces the low pressure outlet zone to become the low pressure zone of step (a) in the next cycle, wherein during step (b) the thus replaced low pressure zone becomes a driving gas zone in a next cycle and wherein the driving gas zone is fluidly connected to the fresh gas zone wherein the high pressure of the driving gas zone levels with the lower pressure of the fresh gas zone.

Applicants found that the process according to the invention a gas can be compressed by making use of a fluid having an elevated temperature. A further advantage is that a compressed gas can be obtained having a higher temperature than the feed gas. This process can advantageously be used in combination with for example a gas turbine, wherein the process according to the invention is used to further compress a partially compressed air flow as obtained in the compressor of a gas turbine process. This is advantageous, because such a set-up would require a smaller air compressor and by consequence a smaller expander to generate the same amount of power as compared to a gas turbine process not using the new process.

Further advantages and preferred embodiments will be described below.

DETAILED DESCRIPTION OF THE INVENTION

Figure 1:
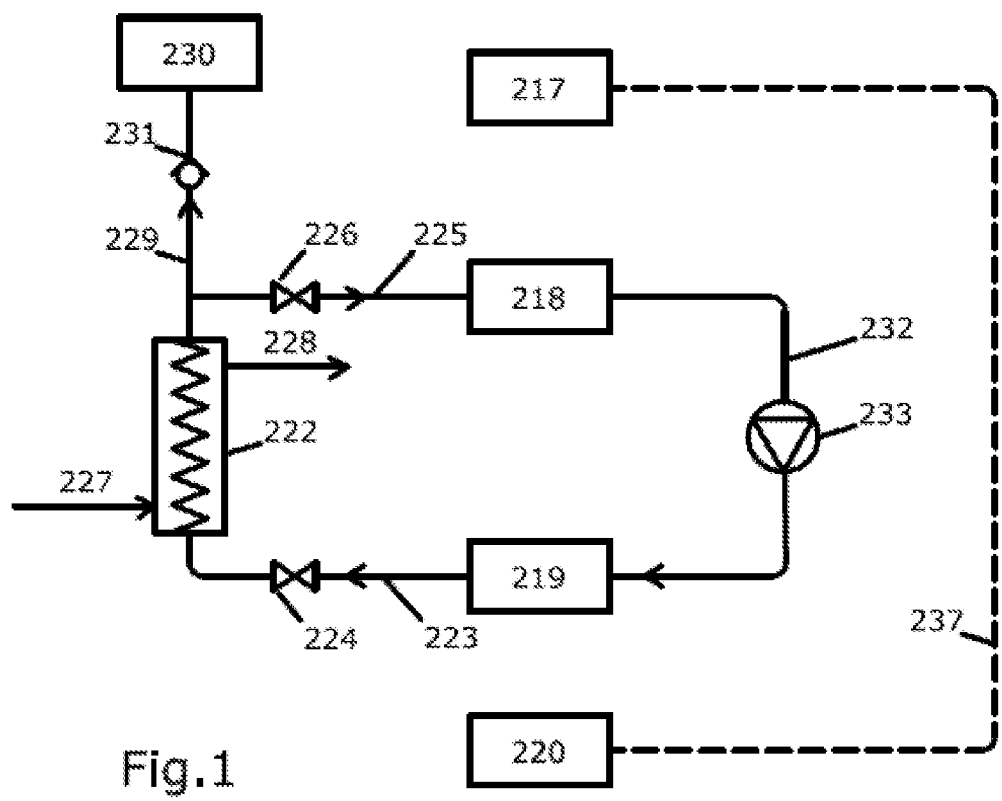
FIG. 1 is a schematic representation of the process according the invention.

The invention is directed to a process to obtain a gas high in pressure and temperature starting from a feed gas making use of the energy contained in the fluid having a higher temperature. This source of energy is different from the rotational energy required to operate a compressor, which is either electrically powered or coupled to an expander as in US-A-2011/0088404. Fluids having an elevated temperature may be exhaust gasses from other processes, exhaust gas from a melting furnaces, gas turbine, gas or diesel engines, incinerators or combinations of said fluids either used in admixture or sequential. A possible fluid may be, optionally partially, generated by on-purpose combustion of a fuel. Possible fuels are hydrogen, synthesis gas or solid, fluid or gaseous carbonaceous fuels, for example natural gas, refinery off-gas, a biomass solid, fluid or gas fuel, a domestic waste fuel, crude oil derived fuel, e.g. kerosene, diesel fuel or bunker fuel. Suitably a mixture comprising an exhaust gas from another process and the combustion gasses generated by this on-purpose combustion of a fuel is used as the fluid having the elevated temperature.

In the process according the invention a fresh part of the feed gas is present in the inlet zone in a further cycle. This is achieved wherein during step (b) a fresh gas zone comprising part the feed replaces the inlet zone to become the inlet zone of step (a) in the next cycle and the thus replaced inlet zone replaces the low pressure outlet zone to become the low pressure outlet zone of step (a) in the next cycle. Suitably during step (b) the thus replaced low outlet pressure zone becomes a driving gas zone in a next cycle.

In the above process the gas zones containing a certain mass of gas having a temperature and pressure connects to the inlet and outlet conduits of the gas zone which is replaced. This will be illustrated further in this description.

The driving gas zone is fluidly connected to the fresh gas zone wherein the high pressure of the driving gas zone levels with the lower pressure of the fresh gas zone. This connection is performed before the fresh gas zone becomes the inlet zone. This pressure levelling is advantageous because use is made of the high pressure of the gas present in the driving gas zone to increase the pressure of the fresh gas. In order to make optimal use of the pressure of the driving gas such levelling may be repeated. Suitably a pre-feed having a lower starting pressure may be increased in n levelling stages using the gas present in the driving gas zone. The pressure of the pre-feed gas may be increased in n levelling stages to the pressure level of the fresh gas zone, wherein the $n^{th}$ levelling stage is wherein the driving gas zone is fluidly connected to the fresh gas zone performed as described above. The remaining part of the driving gas after performing the $n^{th}$ levelling stage is used to increase the pressure of the pre-feed gas in the remaining (n−1) levelling stages.

In the above process the driving gas stage will become a next driving gas stage (stage n−1) in a further cycle. This next driving gas zone will level in pressure with a future fresh gas zone. This future fresh gas zone will become the above fresh gas zone in a next cycle. The foregoing is repeated for the remaining (n−2) levelling stages. Any driving gas remaining after performing the first levelling stage is discharged from the respective gas zone. Suitably this emptied gas zone is provided with the pre-feed gas in a further cycle to become a pre-feed gas zone. This pre-feed gas zone subsequently levels with the remaining driving gas in the first levelling stage in a further cycle.

In step (a) the content of the inlet zone comprising the feed gas is moved to the heat exchange zone, the content of the heat exchange zone is moved to the low pressure outlet zone and the content of the low pressure outlet zone is moved to the inlet zone. Moving the content from one zone to another in step (a) is suitably performed by using a gas driving means, such as for example a ventilator or any other means which create a positive flow from one zone to the other. The driving means do not necessarily create a pressure increase. Thus the energy requirements may be limited for moving the gas from one zone to the other.

Preferably steps (a)-(b) and the cycle described above for the gas levelling are continuously repeated to obtain a continuous flow of gas high in pressure and temperature starting either from fresh gas or a pre-feed gas.

The process according to the invention shall be described making use of FIGS. 1-7. In FIG. 1 illustrates a system comprising a fluidly interconnected inlet zone 219, heat exchange zone 222 and low pressure outlet zone 218. Further a transport line 223 is shown fluidly connecting inlet zone 219 with heat exchange zone 222. In transport line 223 a valve 224 is shown. Further a transport line 225 is shown fluidly connecting heat exchange zone 222 with low pressure outlet zone 218. In transport line 225 a valve 226 is shown. Heat exchange zone 222 is further provided with inlet 227 and outlet 228 for the fluid having a higher temperature. Also shown is a discharge transport line 229 for the gas high in pressure and temperature to a product gas zone 230. In this line 229 a one-way valve 231 is present which allows pressurised gas to pass one way towards the product gas zone 230 when the gas in the heat exchange zone 222 has a pressure above a threshold pressure. Furthermore a connecting transport line 232 is shown fluidly connecting low pressure outlet zone 218 with inlet zone 219. In this transport line 232 a gas pump 233, for example a ventilator, is present.

In step (a) gas is transported from inlet zone 219 to heat exchange zone 222. At the same time the content of heat exchange zone 222 is moved to low pressure outlet zone 218 replacing the content in low pressure outlet zone 218. This replaced content moves to the inlet zone 219. Valve 224 are 226 are open and gas pump 233 is activated to achieve a positive circulating flow from inlet zone 219 via heat exchange zone 222 to low pressure outlet zone 218 and back to inlet zone 219.

In step (b) both valves 224 and 226 are closed and the gas is kept in heat exchange zone 222 for a time sufficient to increase pressure and temperature of the gas by means of indirect heat exchange against the fluid supplied via 227 and discharged via 228. The gas present in the heat exchange zone 222 is thus heated isochorically, i.e. at constant volume by the fluid supplied via 227. The fluid supplied via 227 and discharged via 228 may flow continuously or intermittently. The temperature of the fluid supplied via 227 may be between 100 and 1000° C. or between 175 and 850° C. or between 250 and 400° C. The pressure and temperature will increase and a gas high in pressure and temperature is obtained. Preferably part of the gas high in pressure and temperature is discharged to a product gas zone 230 when the pressure increases to above the threshold value of one-way valve 231.

The valves 224 and 226 are illustrative for any kind of flow interruption means and especially for the flow interruption means described further in this specification.

Preferably steps (a)-(b) are continuously repeated to obtain a continuous flow of gas high in pressure and temperature. When performing step (b) a fresh gas zone 220 containing the fresh part of the feed is connected to transport line 223 and transport line 232 to become inlet zone 219. Former inlet zone 219 is connected to transport lines 225 and 232 to become the low pressure outlet zone 218 of the further cycle and the thus replaced zone 218 becomes driving gas zone 217. Driving gas zone 217 is fluidly connected via transport line 237 with a next fresh gas zone 220. The pressure of the fresh zone 220 is the resultant of the high pressure gas provided to driving gas zone 217 and the pressure of the gas originally present in fresh gas zone 220 before levelling with driving zone 217. In a continuous process operating under steady-state conditions the pressure in new inlet zone 219 will have the same temperature and pressure properties as the gas present in fresh zone 220 of the previous cycle after levelling as described above. This reconnecting of zones 220, 219, 218 and 217 is preferably performed in a process and apparatus described here below.

The steps (a)-(b) of the above process may be performed in parallel operated heat exchange zones. At one moment in time it can be imagined that one heat exchange zone is being filled and discharged according to step (a) and one or more parallel operated heat exchange zones are performing step (b).

The feed or pre-feed gas may be any gas which needs to be increased in temperature and pressure. An example of a gas is steam, for example saturated steam, which may be increased in pressure and temperature to obtain steam having a higher energy content. This steam may be used to drive a steam turbine to generate electricity. The gas may also be for example nitrogen, carbon dioxide, ammonia and non-flammable gasses, such as for example Freon. Another suitable feed or pre-feed gas is oxygen, oxygen enriched air, air or any other oxygen comprising gas. These oxygen comprising gasses may suitably be used as feed component of a combustor as part of a gas turbine or be directly fed to an expander, optionally after further increasing the temperature. In this preferred embodiment part of the fluid having a higher temperature is comprised of the exhaust gas of the expander of the gas turbine. The compression of air as by the process according to the invention may also be used as a first step in a cryogenic air separation process.

The temperature of the pre-feed gas is suitably as low as possible, preferably below 50° C. and even more preferably below 20° C. Low temperature is advantageous because it increases the capacity of a given apparatus in which the process of this invention can be performed. The pressure of the starting gas may be between 0.1 and 0.6 MPa. If the starting gas is an oxygen comprising gas for use as feed component of a combustor as part of a gas turbine or as a feed to an expander it is preferred that the starting gas has a pressure of between 0.11 and 0.6 MPa, preferably obtained in a compressor.

The feed gas as used in step (a) may have a pressure of between 0.2 and 5 MPa and suitably between 0.2 and 3 MPa. In steps (a)-(b) the pressure and temperature of a feed gas is increased by means of indirect heat exchange against the fluid having a higher temperature to obtain a gas high in pressure and temperature.

The compressed gas as obtained in the product zone is suitably between 0.14 and 5 MPa or between 0.14 and 3 MPa. The temperature is suitably between 50 and 550° C. The pressure increase may be between 0.04 and 5 MPa and between 0.04 and 2.5 MPa as calculated either starting from the feed gas or the pre-feed gas. By increasing the number of levelling stages it is possible to achieve higher increases in pressure.

Figure 2:
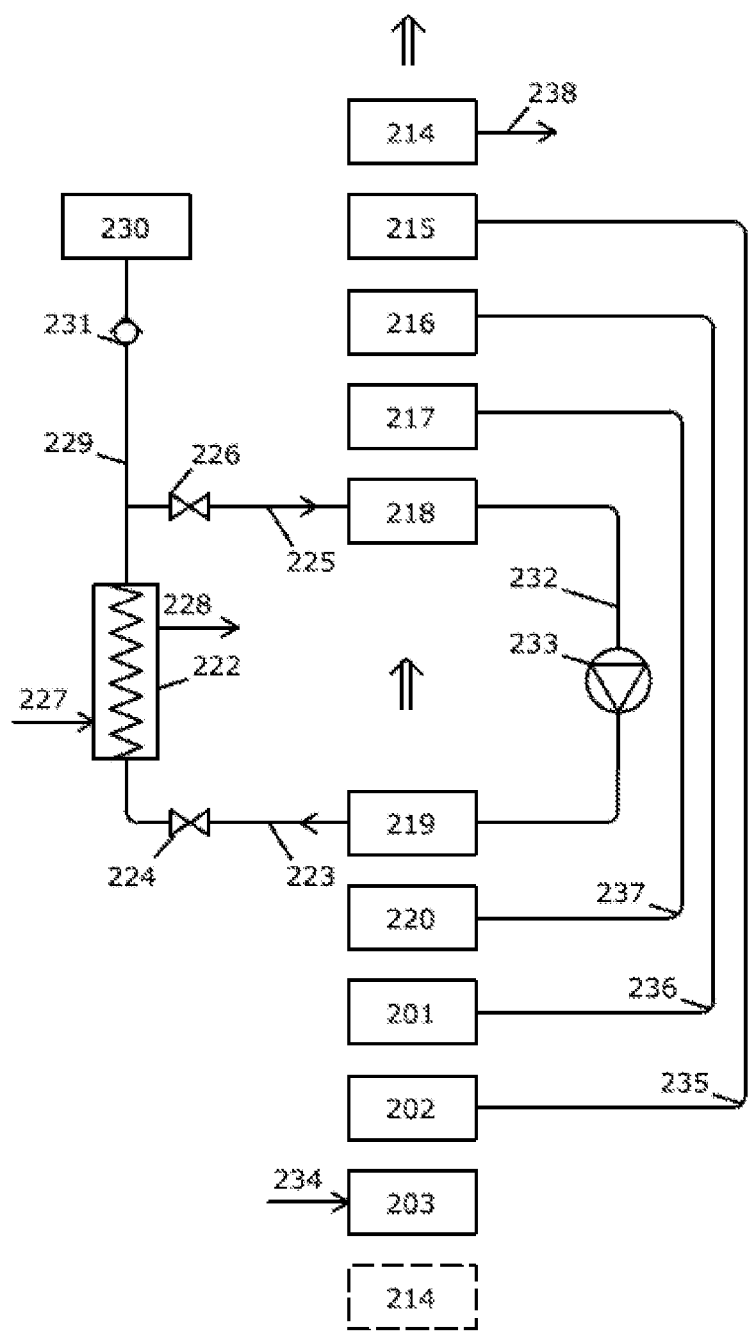
FIG. 2 is a schematic representation of a further embodiment of the process according the invention.

FIG. 2 shows how the driving gas may be mixed in one or more steps with the pre-feed gas to obtain the fresh part of the feed gas having a higher pressure than the pre-feed gas. FIG. 2 shows the configuration with the inlet zone 219, the heat exchange zone 222 and the low pressure outlet zone 218 of FIG. 1. FIG. 2 also shows, in addition to the fresh gas zones 220 and driving gas zone 217 of FIG. 1, a number of further driving gas zone 215, 216, fresh gas zones 201, 202, filing gas zone 203 and discharge gas zone 214. Filing gas zone 203 is fluidly connected with an inlet 234 to receive a pre-feed gas. Gas zone 202 is fluidly connected to driving gas zone 215 via transport line 235. Gas zone 201 is fluidly connected to driving gas zone 216 via transport line 236. Gas zone 220 is fluidly connected to driving gas zone 217 via transport line 237. Gas zone 214 is connected to a gas vent 238. In the process simultaneously filing gas zone 203 moves to position of fresh gas zone 202, fresh gas zone 202 moves to position of fresh gas zone 201, fresh gas zone 201 moves to position of fresh gas zone 220, fresh gas zone 220 moves to position of inlet zone 219, inlet zone 219 moves to position of low pressure outlet zone 218, low pressure outlet zone 218 moves to position of driving gas zone 217, driving gas zone 217 moves to position of driving gas zone 216, driving gas zone 217 moves to position of driving gas zone 216, driving gas zone 216 moves to position of driving gas zone 215, driving gas zone 215 moves to position of discharge gas zone 214 and discharge gas zone 214 moves to position of filing gas zone 203 in a step wise fashion.

When the zones are moved the transport lines 234, 235, 236, 237, 223, 225 and 232 remain in the same position as shown in FIG. 2. Alternatively the zones may remain in the same position as in FIG. 2 and the transport lines are moved in a step wise fashion to achieve the same result. Preferably the steps of moving a zone to a next zone position are continuously repeated to obtain a continuous flow of compressed gas. Preferably one cycle of steps, wherein a cycle is defined in that a zone returns to its starting position, is performed between 1 and 2000 times per minute.

As explained above driving gas zone 217 can level in pressure with fresh gas zone 220. The same levelling also takes place between driving gas zone 216 and gas zone 201 and between driving gas zone 215 and gas zone 202. In this description such a connection between a driving gas zone and a gas zone is referred to a levelling stage. Preferably the pressure of the gas in driving gas zone 214 is close to the pressure of the pre-feed supplied to gas zone 203 such to make the most use of the high pressure of the driving gas.

In the above process of FIG. 2 part of the gas high in temperature and pressure is used as a driving gas to increase the pressure of the pre-feed gas in one or more stages to obtain the feed gas for use in steps (a)-(b). Preferably the pressure of the pre-feed gas is increased in n levelling stages, to obtain a gas present in the fresh zone, wherein n is 2 or more. In the example illustrated in FIG. 2 n is 3. In this process part of the driving gas is added to the gas obtained in the $(n-1)^{th}$ levelling stage to increase the pressure of said gas in the $n^{th}$ levelling stage to obtain the gas present in the fresh zone 220. Part of the remaining driving gas is added to the gas obtained in the $(n-2)^{th}$ levelling stage in the $(n-1)^{th}$ levelling stage. This sequence of adding part of the remaining driving gas to the gas obtained in the previous stage is continued for the remaining (n-2) levelling stages and adding the then remaining driving gas to the pre-feed gas in the 1st levelling stage. If in the above process driving gas remain after performing this 1st levelling stage it is suitably discharged. The number n is suitably between 2 and 500 and preferably n is at least 4.

The below table provides an illustration of the flows, temperatures and pressures of the process of FIG. 2 in an illustrative embodiment of the invention.

| Vessel, transport line or zone | Pressure (bara) | Temperature (° C.) | Flow (kg/s) |
| --- | --- | --- | --- |
| 234 | 1.5 | 21 | 0.226 |
| 202/235/215 | 3.06 | 99 | |
| 201/236/216 | 3.28 | 106 | |
| 220/237/217 | 3.5 | 228 | |
| 219 (when emptying) | 3.5 | 228 | |
| 229 | 4.4 | 230 | 0.226 |

The above process is preferably performed making use of a configuration comprising of a number of interconnected vessels and a distributor. Each vessel represents at one moment one of the above described gas zones, not including the heat exchange zone or zones, and has a different status or state. In a configuration of 2n+4 or more interconnected vessels, wherein n is the number of levelling stages, at least 2n+4 vessels are each in a different state. The different states are State 1 to State 2n+4:

State 1 is a filling state,

State 2 to State (n+1) is a state wherein the content of the vessel increases in pressure by levelling, State (n+2) is wherein the content of the vessel moves in step (a) a heat exchange zone as described above to obtain the gas high in pressure and temperature, State (n+3) is a low pressure outlet state wherein the vessel receives the content of the heat exchange zone in step (a), State (n+5) to State (2n+3) are driving gas states wherein a part of the content of the vessel in State (n+5) to State (2n+3) is used to level with the vessels in State 2 to State (n) as described above, and State (2n+4) is a discharge state wherein the remaining driving gas is discharged from the vessel.

The different states relate to the different gas zones of FIG. 2. In FIG. 2 three levelling stages are shown (n=3). Thus filing gas zone 203 is in State 1, fresh gas zone 202 is in State 2, fresh gas zone 201 is in State 3, fresh gas zone 220 is in State 4, inlet gas zone 219 is in State 5, low pressure outlet gas zone 218 is in State 6, driving gas zone 217 is in State 7, driving gas zone 216 is in State 8, driving gas zone 215 is in State 9 and discharge gas zone 214 is in State 10. The vessels of the process continuously change their state from State 1 to State (2n+4) after which they return to State 1.

As described above State (n+4) to State (2n+3) are states wherein a part of the content of the vessel in State (n+4) to State (2n+3) is used to level with the vessels in State 2 to State (n+1). Because levelling suitably is performed making use of the pressure difference a vessel in State (n+4) will level with the vessel in State (n+1), the vessel in State (n=5) will level with the vessel in State (n), wherein this is repeated until the vessel in State (2n+3) levels with the vessel in State (2).

Figure 3:
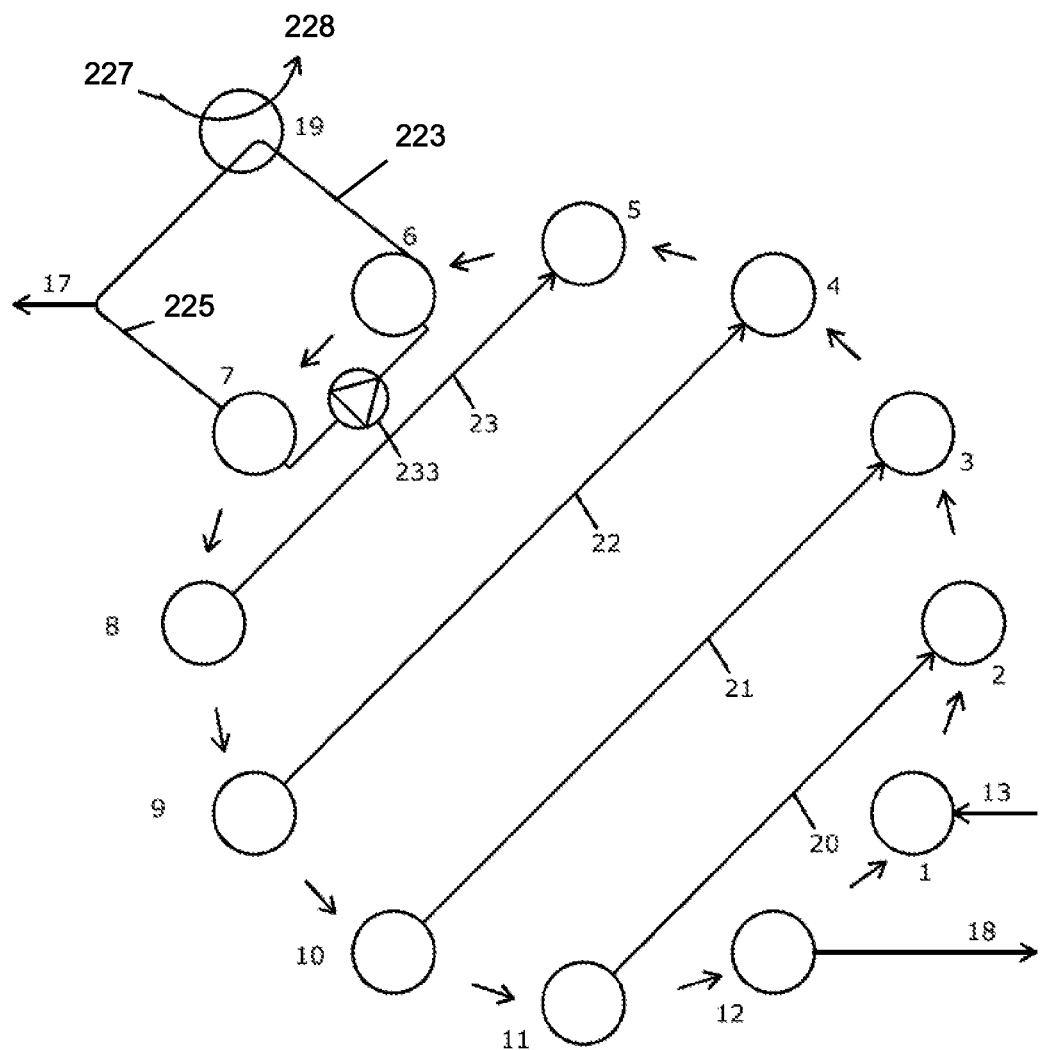
FIG. 3 is a schematic representation of a further embodiment of the process according the invention.

The above process is illustrated by FIG. 3, which shows a configuration in which simultaneously 4 levelling stages take place (n=4). The situation for a single cycle is shown. In FIG. 3 a pre-feed gas 13 is added to a vessel 1 in State 1. Part of the remaining driving gas of vessel 11 in State 11 is added via connecting conduit 20 to vessel 2 in State 2 in first levelling stage thereby increasing the pressure of the gas in vessel 2. Part of the remaining driving gas of vessel 10 in State 10 is added via connecting conduit 21 to the vessel 3 in State 3 in a second levelling stage. Part of the remaining driving gas in vessel 9 in State 9 is added via connecting conduit 22 to the vessel 4 in a third levelling stage. Part of the remaining driving gas in the vessel 8 is added via connecting conduit 23 to the vessel 5 in a fourth levelling stage. In the same cycle the contents of the vessel 6 in State 6 is discharged to a an indirect heat exchanger 19 and the content of the heat exchanger or part of the heat exchanger 19 is discharged to vessel 7 making use of ventilator 25 as in step (a). By moving vessel 6 to the position of vessel 7 and moving vessel 7 to the position of vessel 8 the connection to the heat exchanger is temporarily closed. During this period step (b) may be performed wherein the pressure in enclosed heat exchanger 19 increases and a gas high in temperature and pressure is directly discharged from the heat exchanger 19 via line 17. From the vessel 12 in State 12 the remaining driving gas 18 is discharged from the vessel. In a next cycle this specific vessel will change to State 1 and is ready to be filled again. Simultaneously the state of all the remaining vessels will change to the next state. In such a cycle the vessels move one position counter clockwise in FIG. 3, as illustrated by the arrows, wherein the supply, discharge and connecting conduits 13, 223, 225, 17, 18, 20, 21, 22 and 23 remain in position. This means that in a next cycle step the supply, discharge and connecting conduits 13, 223, 225, 17, 18, 20, 21, 22 and 23 physically connect to a different vessel. By performing these cycles one after the other a continuous process is obtained to increase the pressure of the starting gas.

Figure 4:
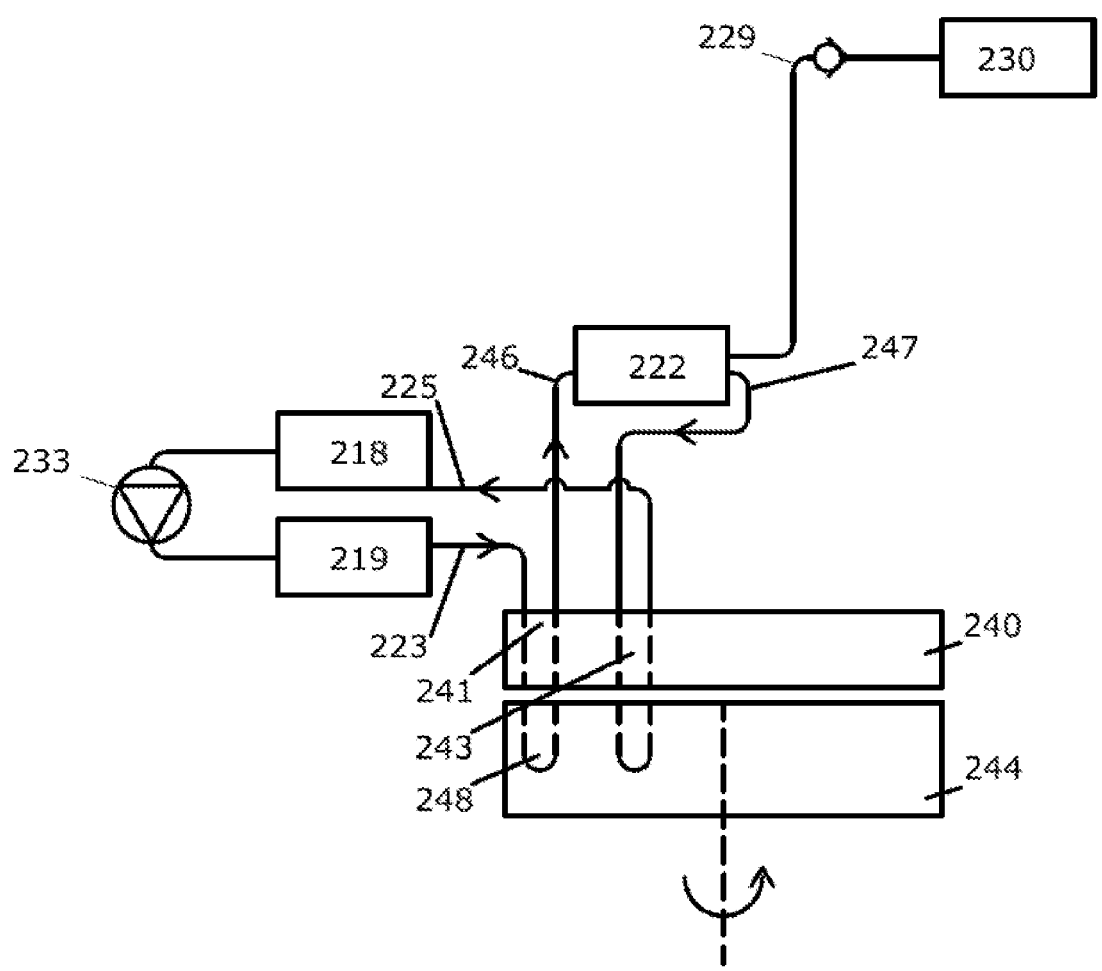
FIG. 4 shows a configuration for feeding a heat exchanger.

The process as illustrated by FIG. 1 may be performed using a configuration provided with valves, wherein valve 224 and 226 are fast switching valves. Preferably a configuration is used having no such valves. Instead of the valves use is made of a rotating heat exchange distributor as illustrated in FIG. 4. FIG. 4 shows how inlet zone 219, low pressure gas zone 218 and driving gas zone 217 connected to a heat exchange zone 222. Such a heat exchange distributor 239 comprises of a fixed part 240 or parts and a rotating part 244. The fixed part 240 is provided with an inlet channel 241 fluidly connected to transport line 223 for supply of gas from inlet zone 219, with outlet channel 243 connected to the transport line 225 for supply of gas to low pressure outlet zone 218. In the situation shown in FIG. 4 transport line 246 is fluidly connected to transport line 223 via inlet channel 241 in fixed part 240 and a connecting channel 248 in the rotating part 244. Transport line 247 is connected to transport line 225 via outlet channel 243 in fixed part 240 and a connecting channel 249 in rotating part 244. Thus gas transport is possible between heat exchange zone 222 and zones 218 and 219 to perform step (a). In other words valve 224 and 226 of FIG. 1 or 2 are open for heat exchange zone 222.

The connecting channels in rotating part 244 are designed such that in a next rotational position transport lines 223 and 225 do not connect via a connecting channel in the rotating part 244. The heat exchange zone 222 will then be enclosed and step (b) may take place. The gas high in temperature and pressure will be discharged to a product gas zone 230 via transport line 229. The frequency at which the gas zones change to a new state as described above and the time at which the heat exchange zone is enclosed may be sufficient to allow the pressure to build up in heat exchange zone. Alternatively a separate heat exchange distributor may be used which can keep the heat exchange zone enclosed for a sufficient time to build up pressure independently from the frequency at which the gas zones change their state.

The process described in FIG. 3 may be performed in a configuration described below.

Configuration comprising a distributor, a heat exchanger, a heat exchange distributor and 2n+4 or more interconnected vessels, wherein n represents the number of levelling stages and is 2 or more, each vessel having an inlet and an outlet connected to the distributor, wherein the distributor is further provided with an inlet to receive a pre-feed gas, an inlet and outlet connected to an outlet and inlet of the heat exchanger, an outlet to discharge a remaining driving gas and an inlet to supply a purging gas. The distributor may fluidly connect:

an inlet conduit for a pre-feed gas to an inlet of a vessel of said configuration;

an inlet of a vessel, an inlet of a different vessel and the outlet of yet another vessel with the heat exchange distributor;

n outlets to discharge a driving gas to respective n inlets of n other vessels of said configuration; and an outlet conduit for purged gas to the outlet of a vessel of said configuration.

The heat exchange distributor is suitably a heat exchange distributor as described above and for example illustrated in FIG. 4.

The distributor is preferably comprised of an intermediate rotating part and two fixed parts at its two opposite ends along the axis of rotation, wherein both fixed parts are provided with inlet and outlet channels. The rotating part is provided with connecting channels and wherein the rotating part is rotationally moveable relative to the two fixed parts. The first and second fixed parts are provided with channels connected to the inlet and outlets of the distributor. Part of the channels of a fixed part may communicate with other channels of the same fixed part or the other fixed part via the connecting channels present in the rotating part at a certain rotational position of the rotating part relative to the fixed parts. At different rotational positions of the rotating part a channel in one fixed part may communicate with a different channel in same or other fixed part. In this manner one vessel may, for example, at certain rotational position be connected to the inlet to receive the starting gas. In a next rotational position the inlet of the same vessel may be connected to receive part of the driving gas as discharged from another vessel. In this manner the process according to the invention may be performed.

Suitably the moveable rotating part is mechanically connected to an external driving means for achieving the rotational movement when in use. Examples of suitable driving means are electrically driven motors, hydraulically driven motors and fuel combustion driven motors.

Figure 5:
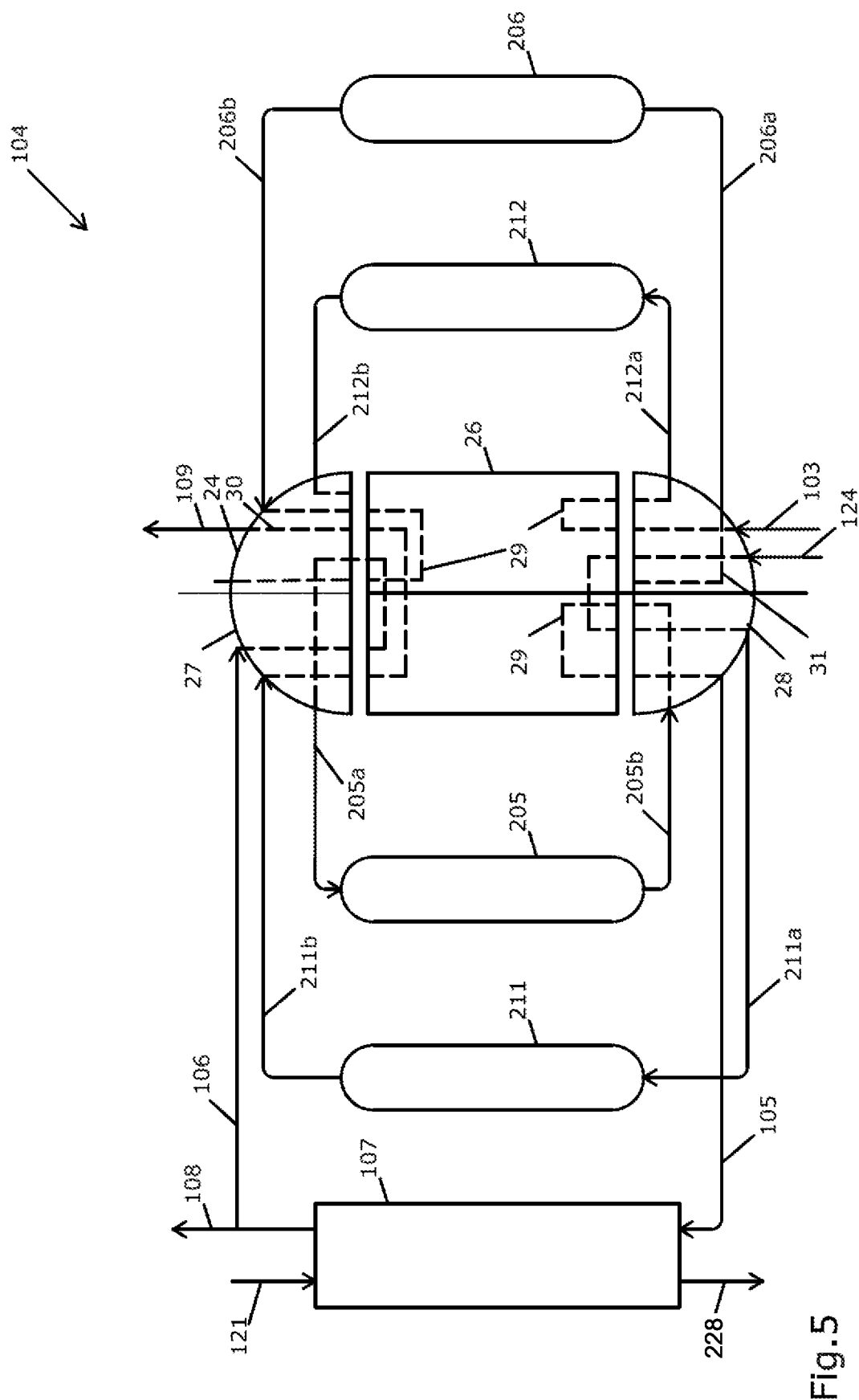
FIG. 5 shows a distributor and part of the vessels of a configuration which may be combined with the process according to the invention.

The above configuration is illustrated by FIG. 5. FIG. 5 shows a configuration 104 consisting of a distributor 24, interconnected vessels 211, 205, 212 and 206 and a heat exchanger 107. Vessel 212 is operating in State 1 (FIG. 3), vessel 211 is operating in State 12 (see FIG. 3), vessel 205 is operating in State 6 (see FIG. 3) and vessel 206 is operating in state 7 (see FIG. 3). Vessels operating in other states illustrated in FIG. 3 are not shown in FIG. 5 for clarity reasons.

Each vessel 211, 205, 212 and 206 has an inlet and an outlet connected to distributor 24 by means of lines 211a, 211b, 205a, 205b, 212a, 212b, 206a and 206b respectively. The distributor 24 is provided with an inlet to receive a pre-feed gas as supplied via line 103. Heat exchanger 107 is represented in this Figure very schematically for clarity reasons and is provided with an outlet to discharge a compressed gas via line 108. The distributor 24 has an inlet and outlet connected to an outlet and inlet of a heat exchanger 107 via lines 106 and 105 respectively. The distributor has an outlet to discharge a remaining driving gas via line 109 and an inlet to supply a purging gas via line 124.

The distributor 24 has an intermediate rotating part 26 and two fixed parts 27, 28 at its two opposite ends. The intermediate rotating part 26 is suitably a cylindrical part. The part 26 is provided with channels 29. The rotating part 26 is rotationally moveable relative to the two fixed parts 27, 28. Preferably the rotating part 26 rotates within a housing (not shown). The, preferably tubular, housing connects the first and second fixed parts 27 and 28. The first and second fixed parts 27, 28 are provided with channels 30, 31 connected to the inlet and outlets of the distributor 24. Part of the channels 30 of flange 27 communicate with other channels 30 of the same fixed part 27 via the communicating channels 29 present in the rotating part 26 at a certain rotational position of the intermediate part 26 relative to the fixed part 27. Channels 29, 30 and 31 are drawn schematically jus to illustrate that connections are possible.

In FIG. 5 it is shown that distributor 24 fluidly connects the inlet line for starting gas 103 with a vessel 212 via channels 31 in flange 28, channels 29 in intermediate part 26 and line 212a. Via these lines vessel 212 is filled with the pre-feed gas. FIG. 5 also shows that the content of vessel 205 is discharged via line 205b, the channels 31 in flange 28, the channels 29 in intermediate part 26 and line 105 to heat exchanger 107. The heated and pressurised gas as discharged via line 108 in step (b) and via line 106 to be returned to a different vessel 206 in step (a). FIG. 5 also shows how vessel 211 is emptied from any remaining driving gas by flushing with a purging gas supplied via line 124, channels 31 in fixed part 28, a connecting channel 29 in rotating part 26 and line 211a. The remaining driving gas and the purging gas are discharged from vessel 211 via lines 211b, channels 30 in fixed part 27 and line 109. By rotating the rotating part 26 to a next position different connections are made such that the vessels of the configuration move up one stage until they reach the final stage after which they start again at stage 1. Suitably every vessel of the configuration will pass all states per full rotation of the rotating part 24. Thus a vessel will return to its initial state when the rotating part 26 is rotated 360°.

Figure 6:
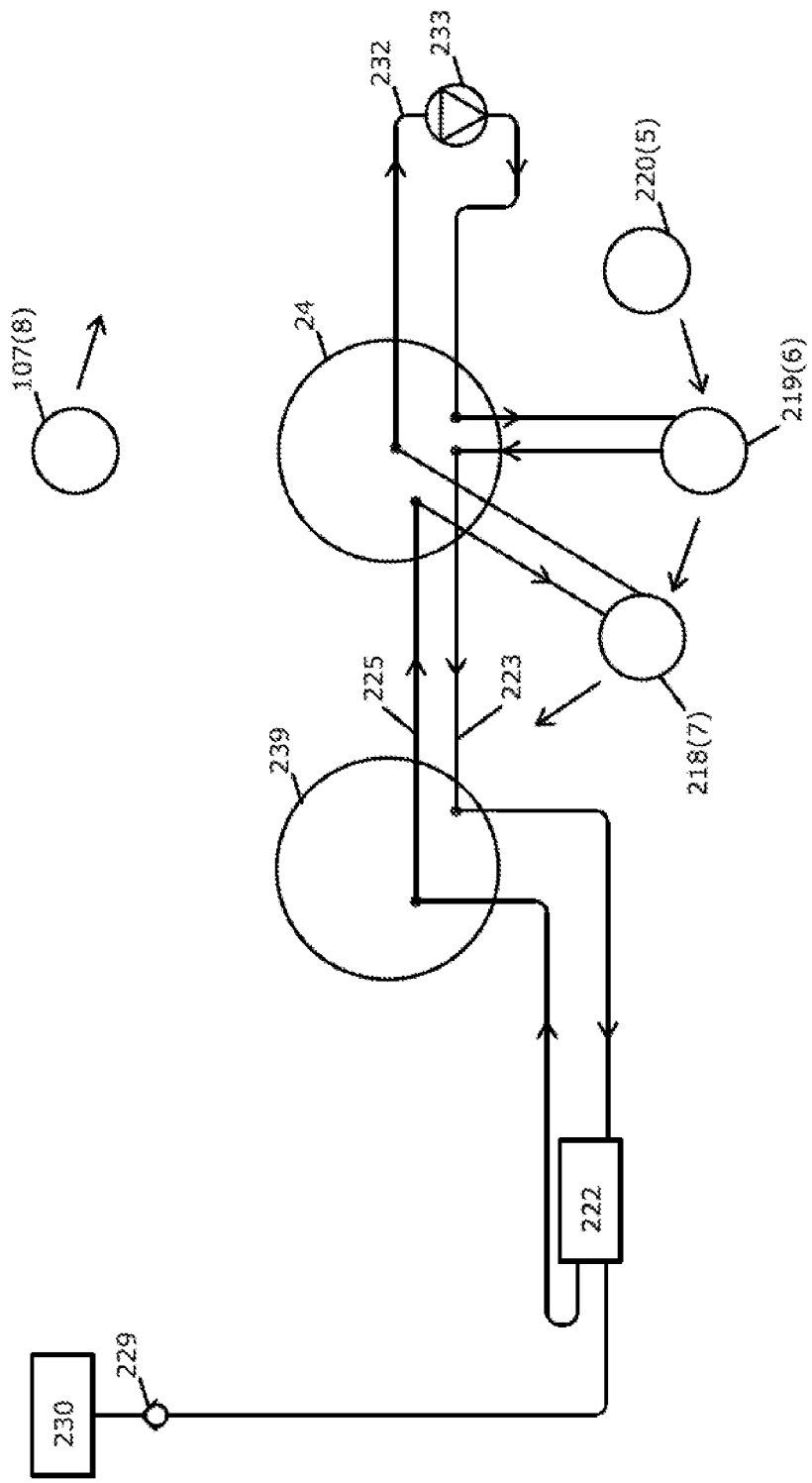
FIG. 6 shows a configuration including a rotating distributor and rotating heat exchange distributor.

The distributor 24 of FIG. 5 can be scaled up for a larger capacity. At a certain capacity the distributor will become too large to efficiently distribute the gasses as explained above. In such a situation it may be advantageous to scale up the vessels, such as the vessels 107, 211, 205, 212 and 206 as shown in FIG. 5, and use multiple distributors 24 operating in parallel and in synchronisation with each other. In that manner one larger vessel is connected to another larger vessel via more than one distributor at one moment in time. The vessels are thus interconnected via more than one distributor and the distributors are configured in parallel relative to each other. FIG. 6 shows how a configuration of a heat exchange distributor of FIG. 4 and a distributor of FIG. 5 can work together. FIG. 6 shows a distributor 24 fluidly connecting inlet zone 219 via transport line 223 and heat exchange distributor 239 to heat exchange zone 222. The outlet of heat exchange zone 222 is fluidly connected via transport line 225 and distributor 24 to low pressure outlet zone 218. Low pressure outlet zone 218 is in turn fluidly connected to inlet zone 219 via transport line 232 and ventilator 233 such that a positive flow of gas is possible from inlet zone 219 to heat exchange zone 222 when performing step (a). The number between brackets refers to the vessel number used in FIG. 3.

By rotating heat exchange distributor 239 will enclose heat exchange zone 222 as illustrated in FIG. 4. By heat exchange the temperature and pressure will increase in this zone 222 and gas high in temperature and pressure is discharges via transport line 229 to product gas zone 230.

By also rotating the rotating part of distributor 24 while heat exchange zone 222 is enclosed vessel 5 can be reconnected and become inlet zone 219, vessel 6 can become low pressure outlet zone 218, vessel 7 can become driving gas zone 217 according to the direction of the arrows. Vessel 8 will further move to a state 9 as shown in FIG. 3. New fresh zone 220 is vessel 4 of FIG. 3. The above shows how the heat exchange distributor 239 and the distributor 24 can function together and result in that the process according to the invention is performed.

In the above configuration of FIG. 6 more than one heat exchange zone may be connected to the heat exchange distributor 239, wherein the heat exchange distributor 239 is designed to alternatingly connect one of the heat exchange zones with distributor 24 to perform step (a) while the remaining zones are performing step (b). Alternatively more than one configuration of distributor 24 and its communicating vessels may be connected to one heat exchange distributor 239, wherein this one heat exchange distributor 239 connects and disconnects each of such a configuration with different heat exchange zone or zones.

The invention is also directed to a configuration suited to perform the above process comprising one or more heat exchange zones 222, a fresh gas zone 220, a gas inlet zone 219, a low pressure outlet zone 218, a product gas zone 230 and a driving gas zone 217, wherein the configuration comprises (i) means to connect and disconnect the heat exchange zone or zones to the gas inlet zone and to the low pressure gas zone, (ii) means to replace the driving gas zone by the low pressure outlet zone, to replace the low pressure outlet zone by the gas inlet zone, to replace the gas inlet zone with the fresh gas zone and The means mentioned above at (i) and (ii) may be the heat exchange distributor and distributor as described above.

The invention is also directed to a process to generate electrical power by means of a gas turbine, wherein said gas turbine uses a fuel and a compressed oxygen comprising gas as feed and wherein the following steps are performed, (aa) compressing an oxygen comprising gas by means of a compressor,
(bb) further compressing said oxygen containing gas by means of a process as described above,
(cc) combusting the fuel with the compressed oxygen containing gas obtained in step (b) to obtain a pressurised combustion gas and
(dd) expanding said combustion gas in an expander of a gas turbine generating electrical power.

Preferably a stream of expanded flue gas is obtained in step (dd) and wherein this flue gas is used to increase the temperature of the compressed oxygen gas by means of indirect heat exchange prior to performing step (cc).

Preferably step (bb) is performed by compressing said oxygen containing gas by means of a process according to the present invention, and wherein the remaining driving gas is combined with the flue gas after being reduced in temperature by means of the heat exchange and wherein the resulting combined gas flow is used as the fluid having a higher temperature in step (b). Preferably the combined gas flow is increased in caloric value prior to be used as the fluid having a higher temperature in step (b) by mixing said combined gas flow with an exhaust gas of another process or by combusting an additional fuel. The additional fuel may be any gaseous, liquid or solid fuel, such as for example natural gas, synthesis gas, hydrogen, refinery off-gas, a biomass solid, such as wood, a domestic waste fuel and crude oil derived fuel, e.g. kerosene, diesel fuel or bunker fuel.

The fuel used in step (cc) may suitably be the same as the above examples described for the additional fuel. Suitably the fuel used in step (cc) is a gaseous or liquid fuel, such as for example natural gas, synthesis gas, hydrogen, refinery off-gas, and crude oil derived fuel, e.g. kerosene, diesel fuel or bunker fuel. Even more preferably the fuel is a gaseous fuel, suitably natural gas, synthesis gas, hydrogen and/or refinery off-gas.

The synthesis gas described above may be obtained by gasification of coal or residual fractions derived from a crude oil. The hydrogen may be obtained by subjecting synthesis gas, such as obtained by these gasification processes, to a water-gas shift reaction.

The compressor used in step (aa) may be directly coupled to the expander of the gas turbine used in step (dd) or preferably connected via a gear box to the expander. This is advantageous when the fluid having a higher temperature as used in the process comprises heated gasses obtained from another process. The compressor may also be driven independently from the gas turbine, for example an electrically driven compressor may be used. The mass flow of such, for example exhaust, gasses may vary and thus the capacity to increase the pressure and temperature may vary. By being able to control the compressor independently from the expander such variations can be compensated for in an easier manner.

Figure 7:
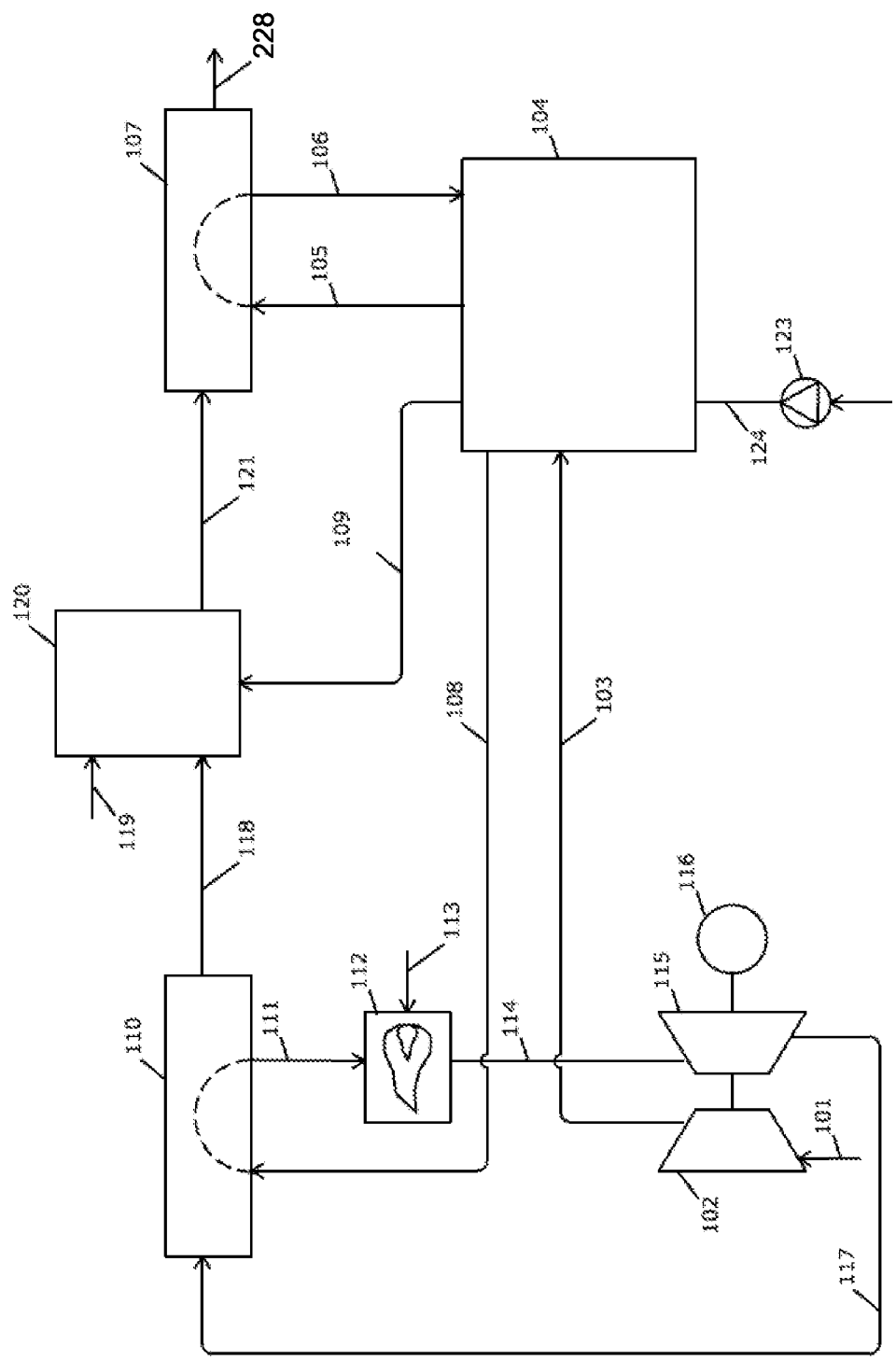
FIG. 7 shows a process flow scheme of a process to generate energy using the process according to the invention.

The above process will be illustrated by FIG. 7. To a compressor 102 an oxygen comprising gas 101, for example air, is supplied to obtain a partly compressed flow 103. This partly compressed gas flow 103 is further compressed in a configuration 104 of FIG. 5. In FIG. 6 this configuration 104 is not drawn in detail for clarity reasons. FIG. 7 shows flow lines 105 and 106 for transport of the contents of a vessel in State (n+2) to and from a heat exchanger 107. Through line 108 a flow of the resulting gas high in temperature and pressure is discharged from a vessel of configuration 104. To empty the vessel from any remaining driving gas just before fresh gas 103 is provided a fan 123 is used to which intake air pushes the remaining driving gas as flow 124 from configuration 104 as flow 109.

The gas 108 is further increased in temperature in heat exchanger 110 to obtain a heated gas 111. The compressed and heated oxygen in heated gas 111 is used to combust a fuel 113 in a combustor 112 to obtain a pressurised combustion gas 114. The pressurised combustion gas 114 is expanded in expander 115 to generate power, e.g. electricity by operating a generator 116 or alternatively rotational energy to drive other equipment, e.g. compressors. The stream of expanded flue gas 117 thus obtained has a high temperature level and is used a heating in heat exchanger 110 thereby obtaining a stream of exhaust gas 118 having a lower temperature. In FIG. 7 this exhaust gas 118 is combined with the remaining driving gas 109 and with a flow 119, which may be the exhaust gas of another process in mixer 120. The resulting combined flow 121 is used as the fluid having a higher temperature in heat exchanger 107.

In the process illustrated by FIG. 7 a flow 119 is mixed with flow 118 and 109. Alternatively or in addition a flow of any hot gas may also be used to increase the temperature level of the pressurised combustion gas 114. Such heat exchange will result in that less fuel 113 is required. It is even possible to reduce the fuel consumption 113 to zero when a hot gas is used having sufficient heating capacity to increase the temperature of the pressurised combustion gas 114 to above 900° C. and preferably to above 950 C. Preferably the hot gas has a temperature of above 600° C., preferably above 800° C. and even more preferably above 950° C. Examples of such hot gasses may be the combustion gasses obtained when combusting or partially combusting a carbonaceous feed or hydrogen. Examples of carbonaceous feeds are biomass, coal, brown coal, oil derived from tar sands, gaseous hydrocarbons, such as natural gas, methane, ethane, propane, LPG, refinery off-gas, crude oil and its fractions and derived products. The hot gas may also be the hot gasses produced in a cement process, aluminium dry hearth melting processes, copper scrap remelt furnaces, aluminium scrap remelt processes, iron reduction process, after burner processes, regenerative thermal oxidizers and the high energy streams as present in chemical and refinery processes, for example steam cracking processes, delayed coking processes, FCC processes and gasification processes.

The process is therefore also directed to a process to generate electrical power by means of a gas expander, wherein said gas turbine uses a fuel and compressed oxygen comprising gas as feed and wherein the following steps are performed,
 (aaa) compressing an oxygen comprising gas by means of a compressor,
 (bbb) further compressing said oxygen containing gas by enclosing part of said gas and increasing the heat and pressure of the enclosed gas by indirect heat exchange against a fluid having a higher temperature thereby obtaining a gas having a higher temperature and pressure by a process described above,
 (ccc) further increasing the temperature of the gas obtained in step (bbb) by indirect heat exchange against a hot gas and by indirect heat exchange against the expanded gas obtained in step (eee)
 (ddd) optionally combusting a fuel with the gas obtained in step (ccc) to obtain a pressurised combustion gas and
 (eee) expanding the gas obtained in step (ccc) or the combustion gas obtained in optional step (ddd) in the expander to obtained expanded gas and wherein the expander is coupled to a generator to generate electrical power.

In the above process step (bbb) is performed by the process to increase pressure and temperature of a feed gas by means of indirect heat exchange according to the present invention. The hot gas may be as described above. The fuel may be as used in step (cc) of the process described above.

Figure 8:
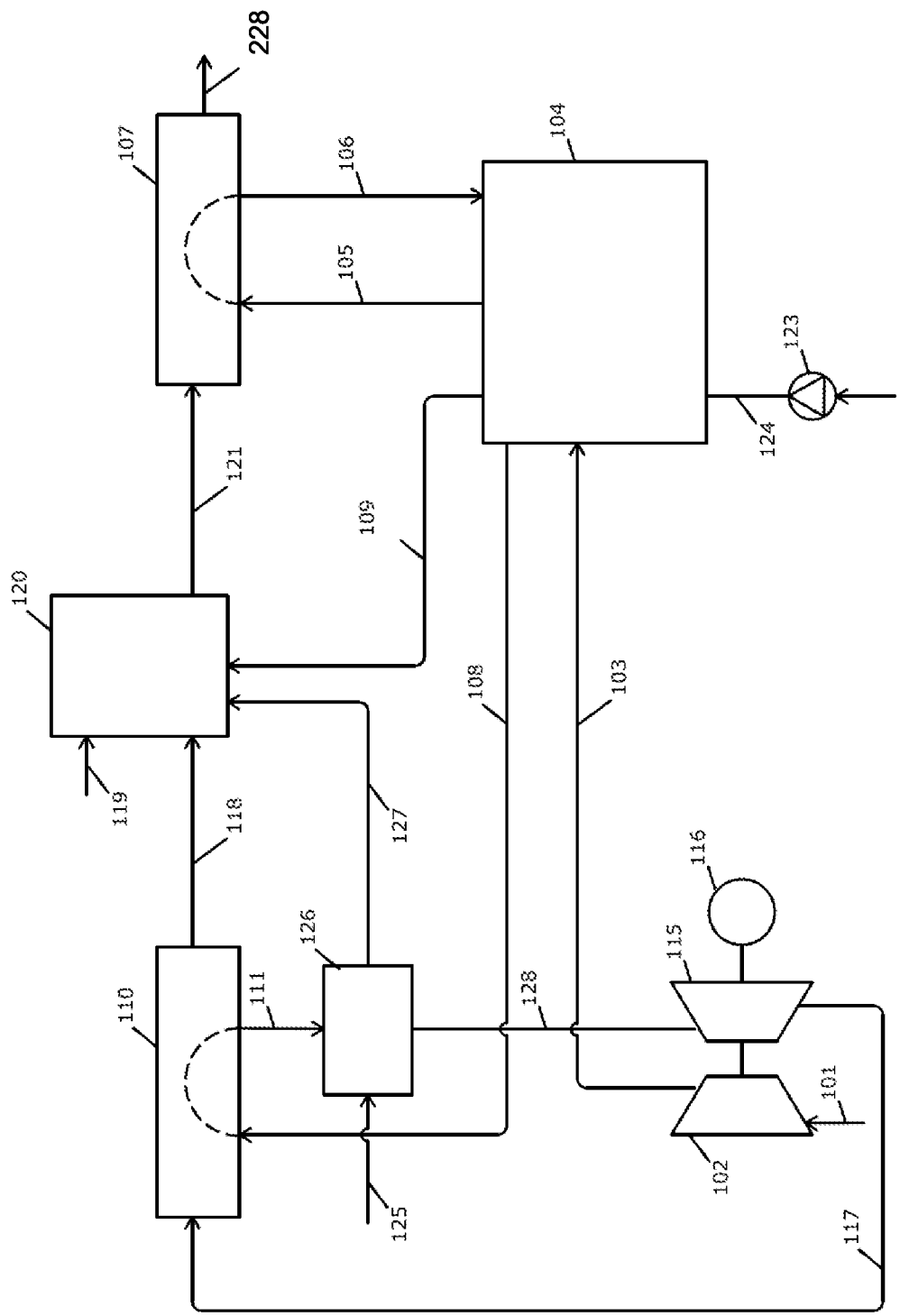
FIG. 8 shows a process flow scheme of a process to generate electricity using the process according to the invention.

The above process wherein optional combustion step (ccc) is omitted is illustrated in FIG. 8. The same references in FIG. 8 have the meaning of those used in FIG. 7. FIG. 8 shows an embodiment wherein the hot gas and the expanded gas used in step (ccc) is subsequently used as the fluid having a higher temperature in step (bbb). The hot gas is provided via flow 125 to a heat exchanger 126 where it further increases the temperature of the heated gas 111 to obtain further heated gas 128. The hot gas suitably has a temperature of above 950° C. such that the further heated gas 128 may have a temperature of above 900° C. This further heated and pressurised gas 128 may be expanded in expander 115 to generate power, e.g. electricity by operating a generator 116 or alternatively rotational energy to drive other equipment, e.g. compressors. The hot gas used in heat exchanger 126 is discharged as flow 127 and combined with the exhaust gas 118 in mixer 120. In case the hot gas is the product gas of a process, e.g. the synthesis gas obtained when partially combusting a carbonaceous feed, or has a different composition than the exhaust gas 118 it may not be desirable to mix these streams. In that situation it may be advantageous to increase the temperature of the exhaust gas 118 by indirect heat exchange against stream 127. The combined gas flows 121 are subsequently used as the fluid having a higher temperature in heat exchanger 107. Flow 119 of FIG. 7 may optionally be added to improve the heating capacity of combined flow 121 in the process illustrated in FIG. 8.

Heat exchanger 126 will have to be suited to perform the heat exchange at a high temperature level. Ceramic heat exchangers are for example suited to perform such a heat exchange.

The process to obtain a gas high in pressure and temperature and its application in a process to generate electrical energy according to the invention may find application in air separation processes, classical energy producing industry, domestic energy production, energy and heat co-generation processes, automotive and marine, for example automotive or marine hybrid engine applications, power generation from high energy streams as present in chemical and refinery processes, for example steam cracking processes, delayed coking processes and gasification processes, cement process, carbon black reactors, iron reduction process, steel soaking pits, incinerators, dryers, aluminium dry hearth melting processes, copper scrap remelt furnaces, aluminium scrap remelt processes, after burner processes, regenerative thermal oxidizers and in power generation applications where a steam cycle is not desired, such as for example in off-shore applications.

The invention claimed is:
1. A process to increase pressure and temperature of a feed gas by means of indirect heat exchange against a fluid having a higher temperature to obtain a gas high in pressure and temperature in a system comprising:
 a number of interconnected vessels, an indirect heat exchanger, and a product gas zone comprising a content of gas,
 wherein one vessel comprises a fluidly interconnected inlet zone comprising a content of the feed gas, another vessel comprises a low pressure outlet zone comprising a content of gas, and the indirect heat exchanger comprises a heat exchange zone comprising a content of gas,
the process comprising:
performing multiple iterations of a cycle comprising steps (a)-(b) wherein in each iteration of the cycle the vessels each become a different zone,
wherein steps (a)-(b) are:
(a) moving the content of the vessel comprising the inlet zone comprising the feed gas to the indirect heat exchanger comprising the heat exchange zone, moving the content of the indirect heat exchanger comprising the heat exchange zone to the vessel comprising the low pressure outlet zone and moving the content of the vessel comprising the low pressure outlet zone to the vessel comprising the inlet zone,
(b) enclosing the indirect heat exchanger comprising the heat exchange zone and maintaining the gas in the indirect heat exchanger comprising the heat exchange zone for a time sufficient to increase pressure and temperature of the gas by means of indirect heat exchange against the fluid wherein the gas high in pressure and temperature discharged to the product gas zone,
 wherein during step (b) a next vessel comprising a fresh gas zone comprising part of the feed gas replaces the vessel comprising the inlet zone to become the vessel comprising the inlet zone of step (a) in a next iteration of the cycle and the thus replaced vessel comprising the inlet zone replaces the vessel comprising the low pressure outlet zone to become the vessel comprising the low pressure zone of step (a) in a next iteration of the cycle, wherein during step (b) the thus replaced vessel comprising the low pressure zone becomes a vessel comprising a driving gas zone in a next iteration of the cycle, and wherein the vessel comprising the driving gas zone is fluidly connected to the vessel comprising the fresh gas zone wherein the content of the vessel comprising the driving gas zone levels in pressure with a lower pressure of the content of the vessel comprising the fresh gas zone; and wherein steps (a)-(b) are continuously repeated to obtain a continuous flow of gas high in pressure and temperature, wherein the gas high in pressure and temperature obtaining in step (b) is an oxygen comprising gas for use as feed component of a combustor as part of a gas turbine.

2. The process according to claim 1, wherein the system comprises 2n+4 interconnected vessels and wherein a pressure of a pre-feed gas is increased inn levelling stages to a pressure level of the vessel comprising the fresh gas zone, wherein the $n^{th}$ levelling stage is wherein the vessel comprising the driving gas zone is fluidly connected to the vessel comprising the fresh gas zone and wherein a remaining part of the driving gas after performing the $n^{th}$ levelling stage is used to increase a pressure of the pre-feed gas in the remaining (n−1) levelling stages.

3. The process according to claim 2, wherein any driving gas remaining in the vessel comprising a discharge gas zone after performing a first levelling stage of the n levelling stages is discharged from the vessel comprising the discharge gas zone to obtain an emptied vessel comprising the gas zone and wherein the emptied vessel comprising the gas zone is provided with the pre-feed gas in a further iteration of the cycle to become a vessel comprising the pre-feed gas zone.

4. The process according to claim 1, wherein moving a content of gas from the vessel comprising one zone to the vessel comprising another zone in step (a) is performed by using a gas driving means.

5. The process according to claim 2, wherein n is between 2 and 500.

6. The process according to claim 5, wherein n is at least 4.

7. The process according to claim 1, wherein in step (b) the fluid having a higher temperature is a gas having a temperature of between 100 and 1000° C.

8. A process to generate electrical power by means of a gas turbine, wherein said gas turbine uses a fuel and a compressed oxygen comprising gas as feed and wherein steps (aa)-(dd) are performed,
(aa) compressing an oxygen comprising gas by means of a compressor,
(bb) further compressing said oxygen containing gas by means of a process according to claim 1,
(cc) combusting the fuel with the compressed oxygen containing gas obtained in step (bb) to obtain a pressurized combustion gas and
(dd) expanding said pressurized combustion gas in an expander of the gas turbine generating electrical power.

9. The process according to claim 8, wherein a stream of expanded flue gas is obtained in step (dd) and wherein the expanded flue gas is used to increase a temperature of the compressed oxygen containing gas by means of indirect heat exchange prior to performing step (cc).

10. The process according to claim 8, wherein the fuel is natural gas, synthesis gas, hydrogen, kerosene or diesel.

11. A process to generate electrical power by means of a gas expander, wherein steps (aaa)-(eee) are performed,
(aaa) compressing an oxygen containing gas by means of a compressor,
(bbb) further compressing said oxygen containing gas by enclosing part of said oxygen containing gas and increasing a temperature and pressure of the enclosed gas by indirect heat exchange against a fluid having a higher temperature thereby obtaining a gas having a higher temperature and pressure by a process according to claim 1,
(ccc) further increasing the temperature of the gas obtained in step (bbb) by indirect heat exchange against a hot gas and by indirect heat exchange against an expanded gas obtained in step (eee)
(ddd) optionally combusting a fuel with the gas obtained in step (ccc) to obtain a pressurised combustion gas and
(eee) expanding the gas obtained in step (ccc) or the pressurised combustion gas obtained in optional step (ddd) in the gas expander to obtained expanded gas and wherein the expander is coupled to a generator to generate electrical power.

12. The process according to claim 11, wherein the hot gas and the expanded gas used in step (ccc) is subsequently used as the fluid having a higher temperature in step (bbb).

* * * * *

UNITED STATES PATENT AND TRADEMARK OFFICE
CERTIFICATE OF CORRECTION

PATENT NO.         : 10,823,065 B2
APPLICATION NO.    : 14/910074
DATED              : November 3, 2020
INVENTOR(S)        : George Johannes Kruijer and Johannes Arjen Hoogland Page 1 of 1

It is certified that error appears in the above-identified patent and that said Letters Patent is hereby corrected as shown below:

On the Title Page

"(73) Assignee: ICE INDUSTRIAL PROPERTIES, Nieuw-Vennep, (NL)" should be replaced with
-- (73) Assignee: ICE INDUSTRIAL PROPERTIES B.V., Nieuw-Vennep, (NL) --

In the Claims

At Column 14, Claim 1, Lines 63-64:
"wherein the gas high in pressure and temperature discharged to the product gas zone," should be replaced with -- wherein the gas high in pressure and temperature is discharged to the product gas zone, --

Signed and Sealed this
Nineteenth Day of January, 2021

Andrei Iancu
*Director of the United States Patent and Trademark Office*